(12) United States Patent
Okabe et al.

(10) Patent No.: US 11,402,124 B2
(45) Date of Patent: Aug. 2, 2022

(54) FLUID HEATER, FLUID CONTROL APPARATUS, AND PRODUCTION METHOD FOR FLUID HEATER

(71) Applicant: FUJIKIN INCORPORATED, Osaka (JP)

(72) Inventors: Tsuneyuki Okabe, Yamanashi (JP); Toshiyuki Inada, Osaka (JP); Taiji Chiba, Osaka (JP); Tatsuhiko Sato, Osaka (JP); Michio Yamaji, Osaka (JP); Tadayuki Yakushijin, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 372 days.

(21) Appl. No.: 16/583,525

(22) Filed: Sep. 26, 2019

(65) Prior Publication Data

US 2020/0018519 A1  Jan. 16, 2020

Related U.S. Application Data

(63) Continuation of application No. PCT/JP2018/009306, filed on Mar. 9, 2018.

(30) Foreign Application Priority Data

Mar. 30, 2017 (JP) .............................. JP2017-068037

(51) Int. Cl.
*F24H 1/10* (2022.01)
*F24H 1/16* (2022.01)
*H05B 3/42* (2006.01)

(52) U.S. Cl.
CPC ............. *F24H 1/105* (2013.01); *F24H 1/162* (2013.01); *H05B 3/42* (2013.01)

(58) Field of Classification Search
None
See application file for complete search history.

(56) References Cited

U.S. PATENT DOCUMENTS

| 941,215 | A | * | 11/1909 | Wade | ...................... | F24H 1/121 |
| | | | | | | 392/494 |
| 1,607,509 | A | * | 11/1926 | Boucher | ................. | F24H 1/102 |
| | | | | | | 392/482 |
| 1,671,677 | A | * | 5/1928 | Keeton | ................... | F24H 1/142 |
| | | | | | | 392/489 |

(Continued)

FOREIGN PATENT DOCUMENTS

| JP | S63-5637 B2 | 2/1988 |
| JP | H10-246356 A | 9/1998 |

(Continued)

OTHER PUBLICATIONS

JPO Notice of Reasons for Refusal for corresponding JP Application No. 2017-068037; dated Jan. 19, 2021.

(Continued)

*Primary Examiner* — Thor S Campbell
(74) *Attorney, Agent, or Firm* — Cantor Colburn LLP

(57) ABSTRACT

A fluid heater includes: a passage member having a passage formed therein; a heater for heating the passage member; a fixing member for fixing the passage member to a fluid control device; and a connection member connected to the passage member so as to allow fluid to flow into the passage member. The passage has a helical shape.

7 Claims, 5 Drawing Sheets

(56) References Cited

U.S. PATENT DOCUMENTS

| | | | | |
|---|---|---|---|---|
| 2,371,723 A * | 3/1945 | Fitzhugh | ................. | F24H 1/102 |
| | | | | 392/488 |
| 2,775,683 A * | 12/1956 | Kleist | ..................... | F28D 7/106 |
| | | | | 392/398 |
| 3,551,641 A | 12/1970 | Truhan | | |
| 3,666,454 A * | 5/1972 | Sarnes | ...................... | B22F 3/26 |
| | | | | 419/38 |
| 3,733,459 A * | 5/1973 | Lengstorf | ............ | F16K 49/002 |
| | | | | 219/201 |
| 3,854,032 A * | 12/1974 | Cooper | ................... | H05B 7/18 |
| | | | | 219/383 |
| 4,199,675 A | 4/1980 | Sharpless | | |
| 4,274,479 A * | 6/1981 | Eastman | ............... | F28D 15/046 |
| | | | | 122/366 |
| 4,465,922 A * | 8/1984 | Kolibas | ................... | F24H 1/121 |
| | | | | 165/156 |
| 4,480,172 A * | 10/1984 | Ciciliot | ................... | H05B 3/42 |
| | | | | 392/396 |
| 4,510,377 A * | 4/1985 | Merritt | ..................... | H05B 3/46 |
| | | | | 219/523 |
| 4,563,571 A * | 1/1986 | Koga | ....................... | H05B 3/42 |
| | | | | 219/543 |
| 5,907,663 A * | 5/1999 | White | ...................... | H05B 3/44 |
| | | | | 392/407 |
| 5,927,608 A * | 7/1999 | Scorsiroli | ............... | F24H 1/102 |
| | | | | 239/284.1 |
| 5,949,958 A * | 9/1999 | Naperkowski | ............ | A61L 2/07 |
| | | | | 392/399 |
| 6,014,498 A | 1/2000 | Ikeda et al. | | |
| 6,060,691 A * | 5/2000 | Minami | ................ | F16K 49/002 |
| | | | | 219/201 |
| 6,217,764 B1 * | 4/2001 | Bellhouse | ............ | B01D 63/063 |
| | | | | 210/321.69 |
| 6,296,007 B1 * | 10/2001 | Cifune | ..................... | F16K 1/22 |
| | | | | 137/15.25 |
| 7,565,065 B2 | 7/2009 | Kato | | |
| 7,677,265 B2 * | 3/2010 | Shikata | ................. | F16K 27/003 |
| | | | | 137/341 |
| 7,726,333 B2 * | 6/2010 | Hoshi | ................... | F24H 9/1863 |
| | | | | 137/341 |
| 7,849,873 B2 * | 12/2010 | Hiratsuka | ............... | F16K 49/00 |
| | | | | 137/341 |
| 8,180,207 B2 * | 5/2012 | Shirai | ..................... | H05B 3/50 |
| | | | | 392/491 |
| 8,731,386 B2 * | 5/2014 | Waechter | .............. | F24H 9/0015 |
| | | | | 392/479 |
| 9,096,931 B2 * | 8/2015 | Yednak, III | ....... | C23C 16/45561 |
| 2004/0188342 A1 * | 9/2004 | Bellhouse | ............ | B01D 63/063 |
| | | | | 210/321.85 |
| 2007/0189741 A1 * | 8/2007 | Gruetzmann | ............ | H05B 3/42 |
| | | | | 392/485 |
| 2012/0241439 A1 * | 9/2012 | Hashimoto | .............. | F01M 5/00 |
| | | | | 219/553 |
| 2014/0261700 A1 * | 9/2014 | Klein | .................... | A47J 31/542 |
| | | | | 137/1 |
| 2017/0074545 A1 * | 3/2017 | Klein | ...................... | F24H 1/102 |
| 2018/0209550 A1 * | 7/2018 | Ukigai | .................... | C23C 16/26 |
| 2020/0383238 A1 * | 12/2020 | Chan | ................... | H05K 7/20509 |
| 2021/0178487 A1 * | 6/2021 | Bar | ........................ | B33Y 10/00 |

FOREIGN PATENT DOCUMENTS

| | | |
|---|---|---|
| JP | H11-348045 A | 12/1999 |
| JP | 2006153419 A | 6/2006 |
| JP | 2016-118320 A | 6/2016 |

OTHER PUBLICATIONS

Jun. 5, 2018 International Search Report issued in International Patent Application No. PCT/JP2018/009306.
KIPO Office Action for corresponding KR Application No. 10-2019-7027238; dated Nov. 24, 2020.

* cited by examiner

FLUID HEATER, FLUID CONTROL APPARATUS, AND PRODUCTION METHOD FOR FLUID HEATER

CROSS REFERENCE TO RELATED APPLICATION

This application is a continuation application of International Application No. PCT/JP2018/009306, filed Mar. 9, 2018, which claims priority to Japanese Patent Application No. 2017-068037, filed Mar. 30, 2017. The contents of these applications are incorporated herein by reference in their entirety.

BACKGROUND

The present disclosure relates to a fluid heater used in a fluid control apparatus used in a semiconductor production apparatus or the like, a fluid control apparatus, and a production method for the fluid heater.

Conventionally, a fluid control apparatus for heating fluid to be supplied into a gas line unit with the aid of a heater has been proposed on H10-246356. Moreover, a fluid heater for heating a purge gas is sometimes provided in a purge gas pipe that is a predetermined gas line among a plurality of gas line units. A fluid heater includes a passage member in which a purge gas flows and a heater for heating the passage member, and a passage extending linearly in an axial direction is formed in the passage member.

SUMMARY

However, the passage member of the conventional fluid heater has poor heating efficiency, and it is necessary to lengthen a heating distance with respect to the gas line unit for heating gas when a desired temperature is high. When the heating distance increases, the size of a passage member and a fluid heater increases, which makes it difficult to realize a further reduction in the size of fluid control apparatuses in recent years.

Therefore, one of the objects of the present disclosure is to provide a fluid heater capable of enhancing fluid heating efficiency and a fluid control apparatus.

A fluid heater in accordance with one or more embodiments includes: a passage member having a passage formed therein; a heater for heating the passage member; a fixing member for fixing the passage member to a fluid control device; and a connection member connected to the passage member so as to allow fluid to flow into the passage member. The passage has a helical shape.

A fluid control apparatus in accordance with one or more embodiments includes: a plurality of fluid control devices fixed to a joint; and a fluid heater for heating fluid flowing into the fluid control device. The fluid heater includes: a passage member having a passage formed therein; a heater for heating the passage member; a fixing member for fixing the passage member to the fluid control device; and a connection member connected to the passage member so as to allow fluid to flow into the passage member. The passage has a helical shape A production method for producing a fluid heater in accordance with one or more embodiments, the fluid heater including: a passage member having a passage formed therein; a heater for heating the passage member; a fixing member for fixing the passage member to a fluid control device; and a connection member connected to the passage member so as to allow fluid to flow into the passage member. The passage has a helical shape. The method includes: manufacturing the passage member by a metal powder sintering shaping method; and combining the heater, the fixing member, and the connection member with the passage member.

DETAILED DESCRIPTION

A fluid heater 20 and a fluid control apparatus 1 according to an embodiment of the present disclosure will be described with reference to the drawings. In the following description, the directions up and down are defined on the basis of the directions up and down in FIG. 2.

Figure 1:
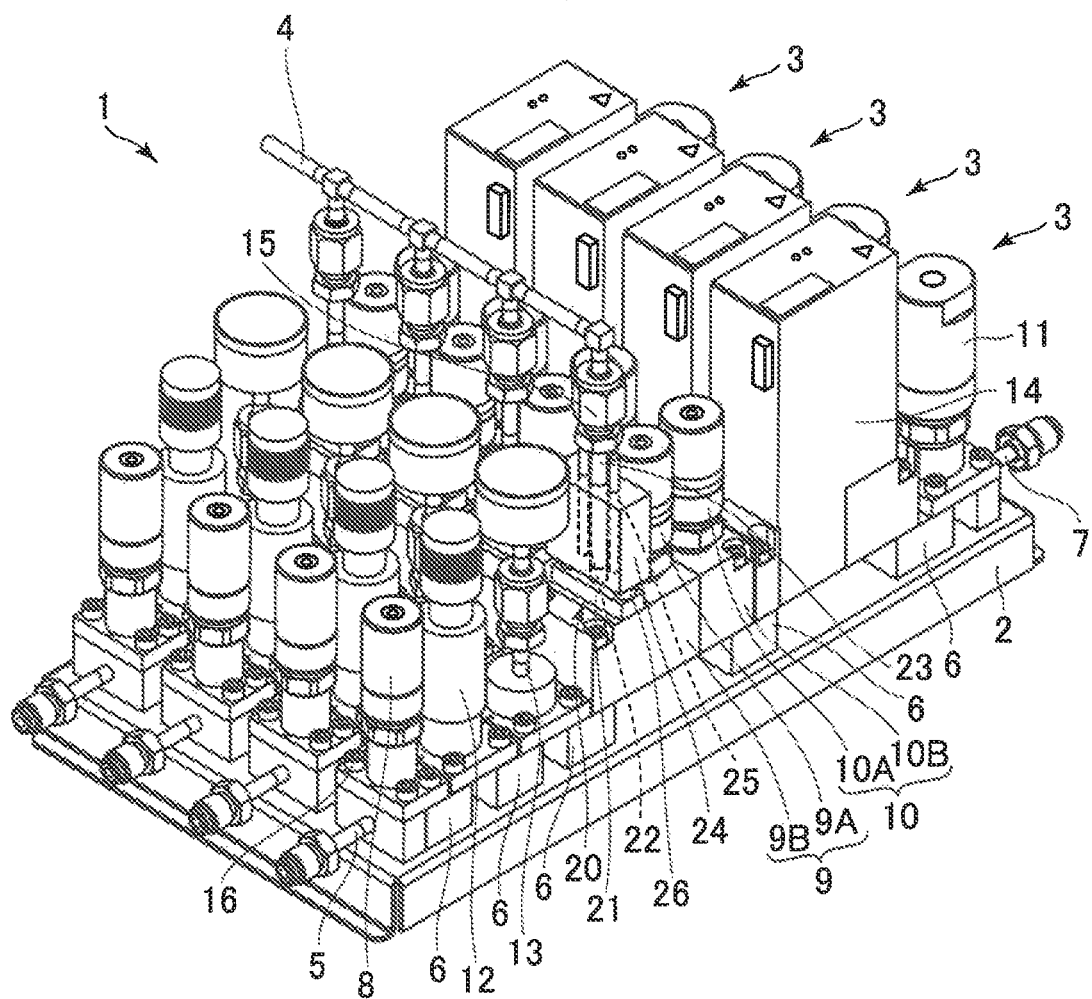
FIG. 1 illustrates a perspective view of a fluid control apparatus according to an embodiment.
Figure 2:
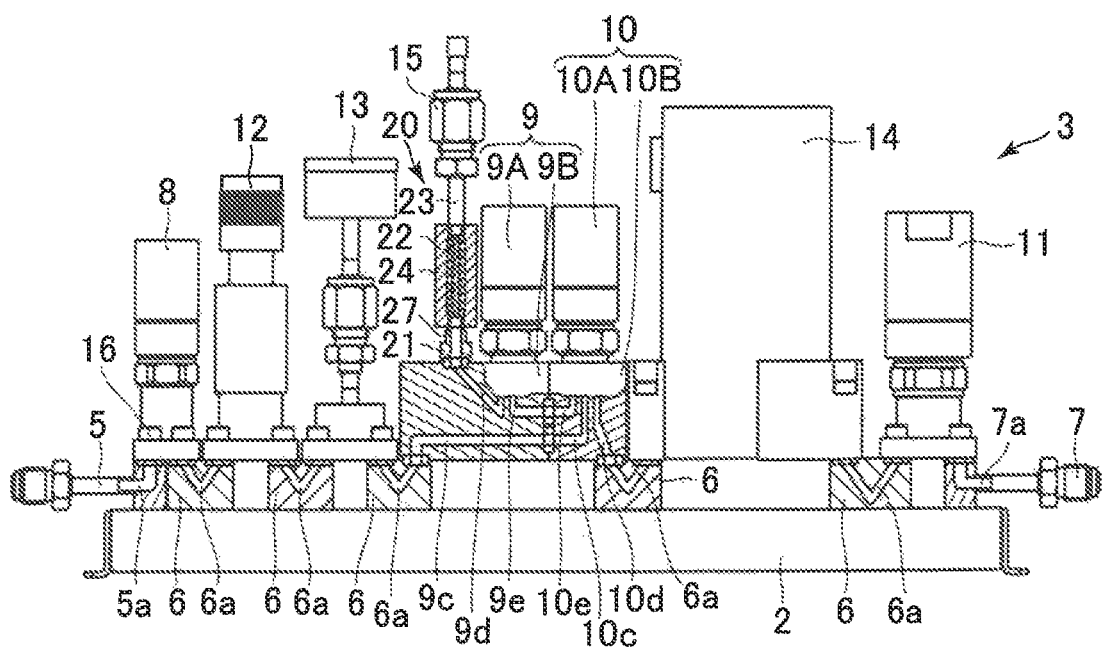
FIG. 2 illustrates a partial cross-sectional view when seen from a lateral direction of the fluid control apparatus according to the embodiment.

FIG. 1 illustrates a perspective view of the fluid control apparatus 1 according to the present embodiment. FIG. 2 illustrates a side view of the fluid control apparatus 1 according to the present embodiment.

The fluid control apparatus 1 includes a base 2, a plurality of (four) gas line units 3, and a main purge gas pipe 4. Since the respective gas line units 3 have substantially the same configuration, only one gas line unit 3 among the plurality of gas line units 3 will be described.

As illustrated in FIG. 1, the gas line unit 3 includes a plurality of joints 5 to 7, a plurality of fluid control devices 8 to 14, a purge gas branch pipe 15, and a fluid heater 20. The fluid heater 20 is provided in only the gas line unit 3 closest on the front side in FIG. 1.

The plurality of joints 5 to 7 include an inlet joint 5 serving as an inlet of a process gas, an outlet joint 7 serving as an outlet of a process gas, and a plurality of block joints 6 disposed between the inlet joint 5 and the outlet joint 7.

The plurality of joints 5 to 7 are provided to be arranged in a line on the base 2 and are fixed to the base 2 by bolts (not illustrated). As illustrated in FIG. 2, gas passages 5a to 7a are formed in the respective joints 5 to 7, respectively. The passages 5a to 7a communicate with the passages of the corresponding fluid control devices 8 to 14.

The plurality of fluid control devices 8 to 14 include valve devices 8 to 11 (a valve device 9 is a first valve device 9, and a valve device 10 is a second valve device 10) which are automatic valve devices (for example, pneumatically operated automatic valve devices), a manual regulator (a reducing valve device) 12, a pressure gauge 13, and a flow control unit (for example, a mass flow controller (MFC)) 14. As illustrated in FIG. 1, the fluid control devices 8 to 14 are coupled to the joints 5 to 7 by bolts 16 (reference numeral is assigned to only one bolt 16 in order to simplify the drawings).

The first valve device 9 includes a first valve body 9A and a first body 9B. The first valve body 9A includes an actuator or the like. A gas passage 9c, a purge gas inflow passage 9d, and a purge gas exhaust passage 9e are formed in the first body 9B.

The second valve device 10 is a three-way valve device and includes a second valve body 10A and a second body 10B. The second valve body 10A includes an actuator or the like. A gas inflow passage 10c, a gas exhaust passage 10d, and a purge gas passage 10e are formed in the second body 10B. The first body 9B and the second body 10B are connected to each other.

The gas passage 9c has one end connected to the passage 6a of the block joint 6 and the other end connected to one end of the gas inflow passage 10c. The purge gas inflow passage 9d has one end connected to the fluid heater 20 and the other end connected to a valve chamber (not illustrated). The purge gas exhaust passage 9e has one end connected to the valve chamber (not illustrated) and the other end connected to one end of the purge gas passage 10e.

The gas inflow passage 10c has one end connected to the other end of the gas passage 9c and the other end connected to the valve chamber (not illustrated). The gas exhaust passage 10d has one end connected to the valve chamber (not illustrated) and the other end connected to the passage 6a of the block joint 6. The purge gas passage 10e has one end connected to the other end of the purge gas exhaust passage 9e and the other end connected to the valve chamber (not illustrated).

The fluid heater 20 is provided on the first body 9B of the first valve device 9.

The purge gas branch pipe 15 has one end connected to the fluid heater 20 and the other end connected to the main purge gas pipe 4.

A process gas flowing from the inlet joint 5 is supplied to a chamber (not illustrated) by passing through the fluid control devices 8 to 14, the plurality of block joints 6, and the outlet joint 7. Moreover, a purge gas (for example, nitrogen) supplied from the main purge gas pipe 4 flows into the purge gas branch pipe 15 and is heated in the fluid heater 20. After that, the purge gas passes through the purge gas inflow passage 9d and the purge gas exhaust passage 9e of the first valve device 9 to flow from the gas inflow passage 10c toward the inlet joint 5 and from the gas exhaust passage 10d toward the outlet joint 7 via the purge gas passage 10e of the second valve device 10.

Next, the fluid heater 20 according to the present embodiment will be described with reference to FIGS. 1 and 2.

The fluid heater 20 includes a fixed block 21, a passage member 22, a connection pipe 23, an aluminum block 24, and a pair of heaters 25.

The fixed block 21 which is a fixed member is fixed to the first body 9B of the first valve device 9 by a bolt 26. The fixed block 21 has a passage portion 27, and an upper end thereof is connected to a lower end of the passage member 22.

The connection pipe 23 has an upper end connected to the purge gas branch pipe 15 and a lower end connected to the upper end of the passage member 22. The connection pipe 23 corresponds to a connection member.

The aluminum block 24 is configured to cover the passage member 22. A peripheral surface of the aluminum block 24 may be covered by a heat insulating jacket.

The pair of heaters 25 is buried in the aluminum block 24 to generate heat to thereby heat the aluminum block 24 and the passage member 22. Moreover, a power lead wire (not illustrated) is connected to the heater 25, and electricity is supplied to the heater 25 via the power lead wire (not illustrated) whereby the heater 25 generates heat. The heater 25 may be in direct contact with the passage member 22 to heat the passage member 22 instead of providing the aluminum block 24. Moreover, the fluid heater 20 is manufactured by combining the heater 25 attached to the aluminum block 24 with the passage member 22.

Next, the passage member 22 according to the present embodiment will be described with reference to FIG. 3.

Figure 3A:
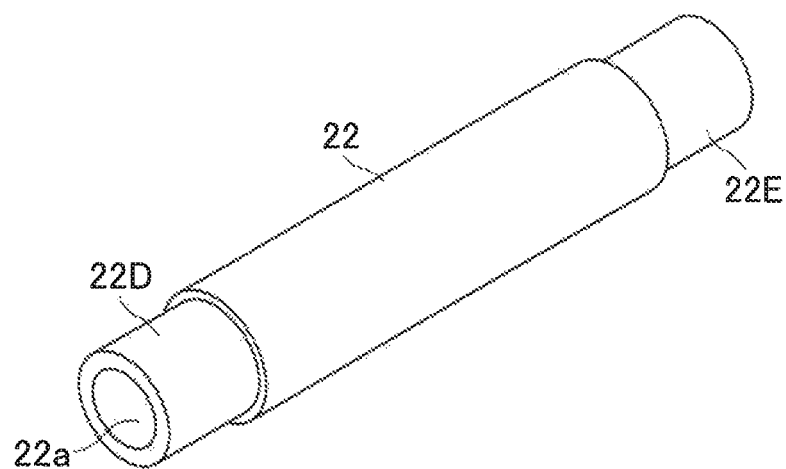
FIG. 3A illustrates a perspective view of a passage member according to an embodiment and FIG. 3B illustrates a vertical cross-sectional view of the passage member according to the embodiment.
Figure 3B:
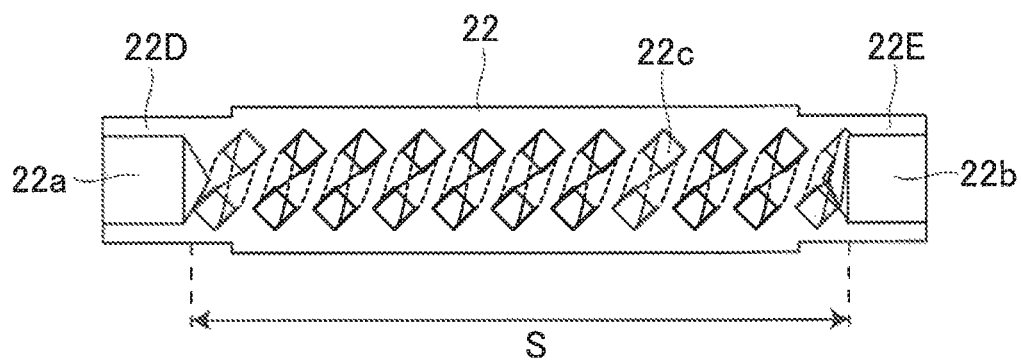

FIG. 3A illustrates a perspective view of the passage member 22 and FIG. 3B illustrates a vertical cross-sectional view of the passage member 22. Although FIG. 3B is a cross-sectional view, hatching patterns are not added so that passages are depicted more clearly.

As illustrated in FIG. 3A, the passage member 22 has a columnar shape or an approximately columnar shape, and openings 22a and 22b are formed in both ends 22D and 22E, respectively. A passage 22c is formed in a helical shape between the openings 22a and 22b at both ends. The passage 22c communicates with the openings 22a and 22b at both ends thereof. A cross-sectional shape in a longitudinal direction of the passage member 22, of the passage 22c is a polygonal shape (in the present embodiment, a diamond shape). A polygonal shape is a figure surrounded by three or more line segments.

The passage member 22 is formed by a three-dimensional shaping apparatus repeatedly executing a step of stacking metal powder of stainless steel, titanium, or the like on the basis of data for forming the passage member 22 and a step of welding (sintering) the stacked metal powder layers using a laser or an electron beam whereby the passage member 22 without the openings 22a and 22b is shaped. In this manner, the passage member 22 is produced by a metal powder sintering shaping method. After the passage member 22 without the openings 22a and 22b is shaped, the openings 22a and 22b are drilled into the ends 22D and 22E at both ends whereby the passage member 22 is produced. Moreover, the ends 22D and 22E of the passage member 22 are cut by an end mill or the like so that the outer shape is reduced in diameter. In this way, the thickness of the ends 22D and 22E of the passage member 22 is decreased to improve the property of being welded to the connection pipe 23 and the passage portion 27.

Figure 4:
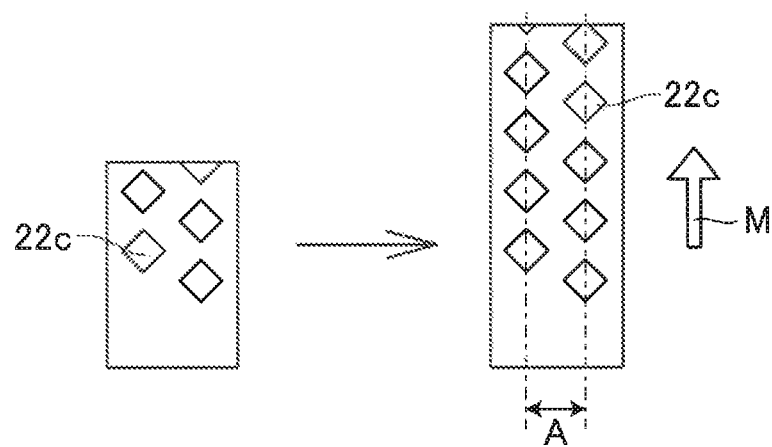
FIG. 4 illustrates an explanatory diagram of a passage member shaping method.

As illustrated in FIG. 4, the passage member 22 is shaped so that the longitudinal direction thereof is the same as a shaping direction M. Moreover, the pair of heaters 25, the fixed block 21, and the connection pipe 23 are combined with the passage member 22 prepared by a metal powder sintering shaping method whereby a fluid heater is produced. Although FIG. 4 is a cross-sectional view, hatching patterns are not added so that passages are depicted more clearly.

A surface area of the passage 22c is larger than a surface area of the perimeter of the passage member 22 in a portion where the passage 22c is formed. That is, the surface area of the passage 22c is larger than the surface area of the perimeter of the passage member 22 in a range indicated by arrow S in FIG. 3B. Such a configuration can be shaped by widening a passage interval in the radial direction and shortening the passage interval in the shaping direction M while securing the thicknesses of the passage 22c and the peripheral surface of the passage member 22 so as to endure the pressure of fluid flowing through the passage 22c.

Moreover, the cross-sectional shape of the passage 22c may be configured such that an inner portion than a central portion in the radial direction protrudes toward the inner side. In this case, the cross-sectional shape of the passage 22c may be a circular shape, an elliptical shape, or the like. Due to this configuration, it is possible to decrease the number of materials necessary for shaping the passage member 22 and to enhance fluid heating efficiency.

According to the passage member 22, the passage 22c has a helical shape and a polygonal cross-sectional shape. Therefore, in a case in which it is necessary to secure a certain distance A between the centers of the passage 22c and a certain distance to the peripheral surface from the passage 22c in FIG. 4 in order to secure the strength of the passage member 22, by changing the cross-sectional shape of the passage to a rectangular shape, a hexagonal shape, or the like, it is possible to increase the fluid contact area as compared to the circular cross-sectional shape and to enhance the fluid heating efficiency.

The passage 22c has a diamond shape of which one diagonal line is parallel to the shaping direction M of the passage member 22. Due to this, since surfaces that form the passage 22c are made up of surfaces inclined with respect to the shaping direction M, occurrence of a warp or an unevenness which is likely to occur in an overhanging portion can be prevented. Therefore, it is possible to enhance shaping accuracy of the passage 22c and to suppress a temperature variation during heating between passage members 22. Therefore, it is possible to provide the fluid heater 20 capable of heating a purge gas to a desired temperature.

The passage member 22 is shaped such that the longitudinal direction thereof is the same as the shaping direction M. Due to this, it is possible to prevent a warp during shaping of the passage member 22 and to enhance shaping accuracy. Therefore, it is possible to suppress a temperature variation during heating between passage members 22. Therefore, it is possible to provide the fluid heater 20 capable of heating a purge gas to a desired temperature.

The present disclosure is not limited to the above-described embodiment. Those skilled in the art can made various additions, changes, and the like within the scope of the present disclosure.

Figure 5A:
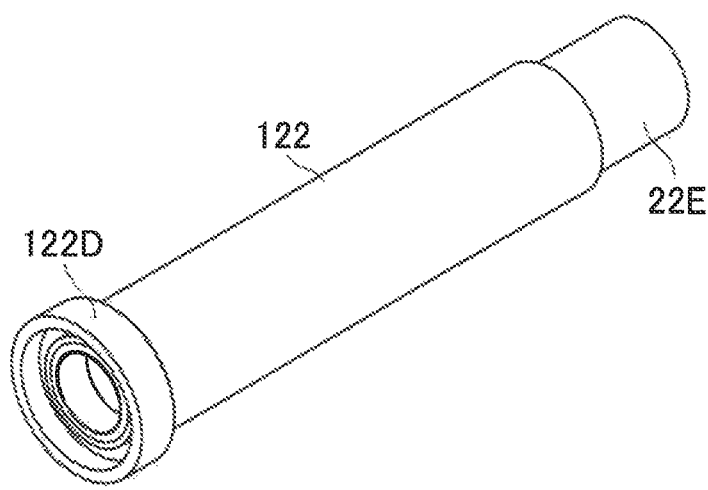
FIG. 5A illustrates a perspective view of a passage member according to a modification and FIG. 5B illustrates a vertical cross-sectional view of the passage member according to the modification.
Figure 5B:
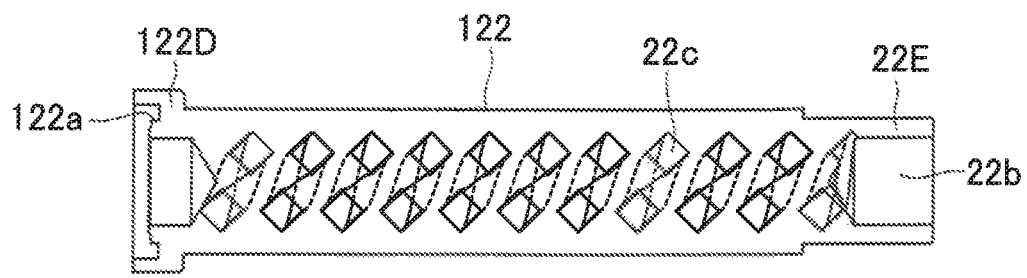

In the above-described embodiment, one end 22D of the passage member 22 is connected to the passage portion 27 of the fixed block 21 and is connected to the fluid control device via the passage portion 27. However, similarly to an end 122D of a passage member 122 illustrated in FIG. 5, an annular concave portion 122a capable of accommodating a gasket may be formed in one end so as to be directly connected to another fluid control device. Although FIG. 5B is a cross-sectional view, hatching patterns are not added so that passages are depicted more clearly.

In the above-described embodiment, although the fluid heater 20 is used for heating a purge gas, the fluid heater 20 may be also used for heating a process gas. Moreover, the shape of the passage 22c is not limited to a diamond shape but may be another shape as long as it is a polygonal shape. Although one passage 22c is formed, a plurality of passages may be formed.

In the embodiment, although the fluid control apparatus 1 includes an on-off valve device, a pressure gauge, a regulator, and a mass flow controller as a fluid control device, the fluid control apparatus 1 may further include a filter, a check valve device, and the like.

Figure 6:
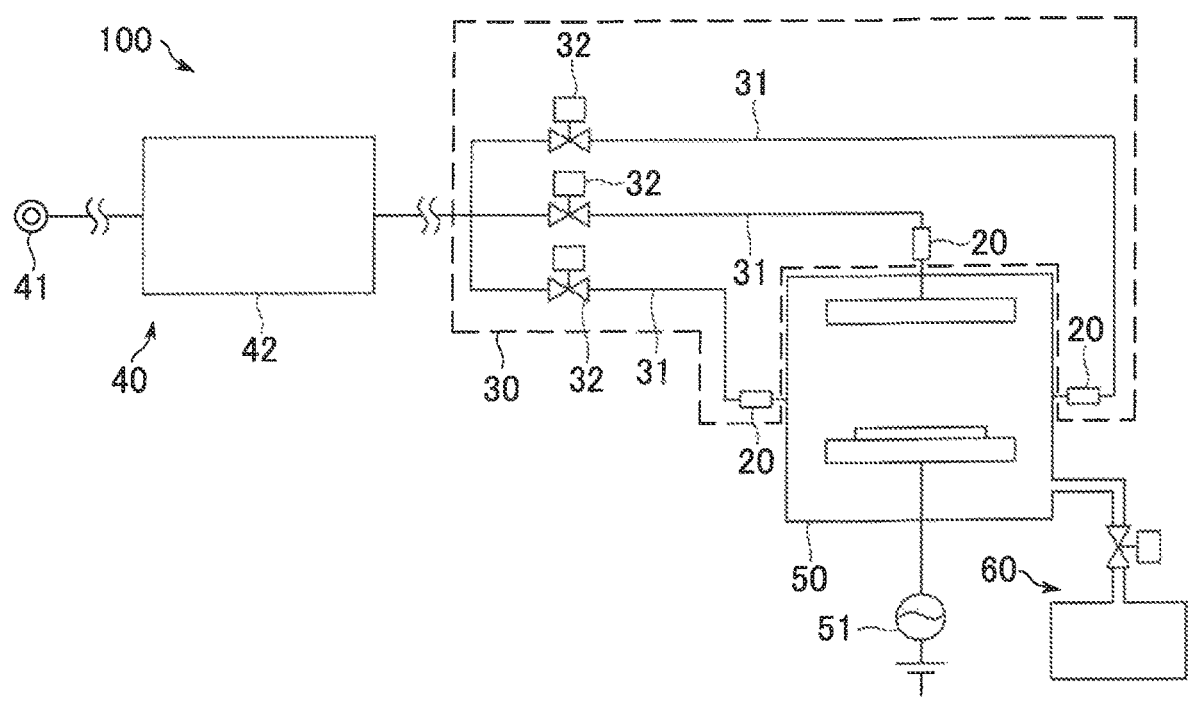
FIG. 6 illustrates a schematic diagram of a semiconductor production apparatus including a final valve device as the fluid control apparatus according to the embodiment of the present disclosure.

In the above-described embodiment, although the fluid control apparatus 1 including the fluid heater 20 is a gas supplying device, the fluid control apparatus may be a final valve device 30 as illustrated in FIG. 6.

FIG. 6 illustrates a schematic diagram of a semiconductor production apparatus 100 including the final valve device 30 as the fluid control apparatus according to the embodiment of the present disclosure.

The semiconductor production apparatus 100 is a CVD apparatus, for example, and is an apparatus which includes a gas supply unit 40, the final valve device 30, a vacuum chamber 50, an exhaust unit 60 and which forms a passive film (an oxide film) on a wafer.

The gas supply unit 40 includes a gas supply source 41 and a fluid control device 42. The final valve device 30 is provided between the gas supply unit 40 and the vacuum chamber 50. The final valve device 30 includes three pipes 31, and an automatic valve device 32 and a fluid heater 20 are provided in each pipe 31. The fluid heaters 20 are provided close to an entrance of the vacuum chamber 50, and gas heated by the fluid heaters 20 is supplied into the vacuum chamber 50.

Since a conventional fluid heater has a large size, it is necessary to provide the fluid heater so as to be separated from a chamber. According to the configuration of the fluid heater 20 of the present embodiment, since the fluid heater 20 can be provided close to the entrance of the vacuum chamber 50, it is possible to supply gas heated to a desired temperature into the vacuum chamber 50.

The fluid control device is not limited to a final valve device, but may be an arbitrary device such as a DLI vaporizer, a carrier vaporizer, or a pre-heated purge line may be used as long as the device requires heating of fluid.

What is claimed is:

1. A fluid heater comprising:
a passage member having a passage formed therein and manufactured by a metal powder sintering shaping method;
a heater for heating the passage member;
a fixing member for fixing the passage member to a fluid control device; and
a connection member connected to the passage member so as to allow fluid to flow into the passage member,
wherein the passage has a helical shape,
a cross section along a longitudinal direction of the passage has a polygonal shape, and
the passage member is shaped so that a shaping direction thereof is parallel to one of diagonal lines of the polygonal shape.

2. The fluid heater according to claim 1, wherein a surface area of the passage is larger than a surface area of a perimeter of the passage member in a portion where the passage is formed.

3. A fluid control apparatus comprising:
a plurality of fluid control devices fixed to a joint; and
a fluid heater for heating fluid flowing into the fluid control device, the fluid heater including:
a passage member having a passage formed therein and manufactured by a metal powder sintering shaping method;
a heater for heating the passage member;
a fixing member for fixing the passage member to the fluid control device; and
a connection member connected to the passage member so as to allow fluid to flow into the passage member,
wherein the passage has a helical shape,
a cross section along a longitudinal direction of the passage has a polygonal shape, and the passage member is shaped so that a shaping direction thereof is parallel to one of diagonal lines of the polygonal shape.

4. The fluid heater according to claim 3, wherein a surface area of the passage is larger than a surface area of a perimeter of the passage member in a portion where the passage is formed.

5. A production method for producing a fluid heater which includes: a passage member having a passage formed therein; a heater for heating the passage member; a fixing member for fixing the passage member to a fluid control device; and a connection member connected to the passage member so as to allow fluid to flow into the passage member, wherein the passage has a helical shape, the method comprising:

manufacturing the passage member by a metal powder sintering shaping method; and combining the heater, the fixing member, and the connection member with the passage member, wherein a cross section along a longitudinal direction of the passage has a polygonal shape, and the passage member is shaped so that a shaping direction thereof is parallel to one of diagonal lines of the polygonal shape.

6. The production method for producing a fluid heater according to claim 5, wherein the passage member has a columnar shape and is shaped so that a longitudinal direction thereof is the same as a shaping direction of the passage member.

7. The production method for producing a fluid heater according to claim 5, wherein a surface area of the passage is larger than a surface area of a perimeter of the passage member in a portion where the passage is formed.

* * * * *